United States Patent
Hayashi et al.

[11] Patent Number: 6,083,613
[45] Date of Patent: Jul. 4, 2000

[54] SHEET FOR PROTECTING PAINT FILM

[75] Inventors: Keiji Hayashi; Mitsuyoshi Shirai; Kenji Sano; Tsuyoshi Inoue; Kenichi Shibata; Mitsuru Horada, all of Osaka; Komaharu Matsui, Kanagawa; Takeshi Eda; Hiroshi Ueda, both of Hyogo, all of Japan

[73] Assignees: Nitto Denko Corporation, Osaka; Kansai Paint Co., Ltd., Hyogo, both of Japan

[21] Appl. No.: 09/084,991

[22] Filed: May 28, 1998

[30] Foreign Application Priority Data

May 29, 1997 [JP] Japan .................................. 9-157684

[51] Int. Cl.⁷ ...................................................... B32B 7/12
[52] U.S. Cl. ..................................... 428/315.7; 428/315.9; 428/317.3; 428/317.7; 428/355 BL
[58] Field of Search .......................................... 428/315.7

[56] References Cited

U.S. PATENT DOCUMENTS

| | | | |
|---|---|---|---|
| 5,518,786 | 5/1996 | Johnson et al. | 428/40.6 |
| 5,601,917 | 2/1997 | Matsui et al. | 428/356 |
| 5,612,135 | 3/1997 | Matsui et al. | 428/343 |
| 5,747,132 | 5/1998 | Matsui et al. | 428/41.7 |
| 5,750,234 | 5/1998 | Johnson et al. | 428/141 |
| 5,810,960 | 9/1998 | Matsui et al. | 156/305 |
| 5,882,775 | 3/1999 | Matsui et al. | 428/213 |

FOREIGN PATENT DOCUMENTS

| | | |
|---|---|---|
| 0 336 727 A2 | 10/1989 | European Pat. Off. . |
| 0 519 278 A2 | 12/1992 | European Pat. Off. . |
| 0 707 053 A2 | 4/1996 | European Pat. Off. . |

OTHER PUBLICATIONS

*Patent Abstracts of Japan*, vol. 095, No. 006, Jul. 31, 1995.

*Primary Examiner*—Ellen M. McAvoy
*Attorney, Agent, or Firm*—Sughrue, Mion, Zinn, Macpeak & Seas, PLLC

[57] ABSTRACT

A sheet for protecting a paint film is disclosed, which does not cause deterioration or discoloration the paint film even when the sheet is adhered to protect the paint film under the condition containing water or water vapor over a long period of time and thus can maintain the adhered state without peeled off the sheet. The sheet for protecting a paint film comprises a multi-layer substrate comprising a water or water vapor barrier layer as a surface layer and a water or water vapor-permeable layer as a back, and a pressure-sensitive adhesive layer formed on the water or water vapor-permeable layer.

8 Claims, 1 Drawing Sheet

FIGURE
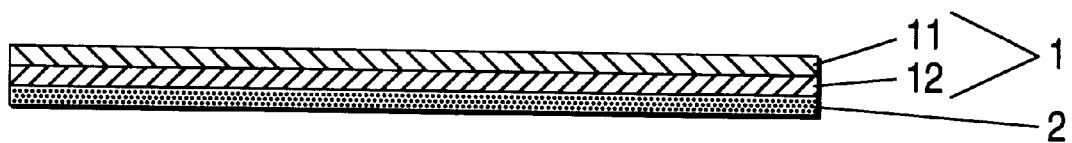

SHEET FOR PROTECTING PAINT FILM

FIELD OF THE INVENTION

The present invention relates to a sheet for protecting a paint film, which is suitable for the protection of a surface of body or parts of automobiles, coated steels, etc., and is difficult to deteriorate or discolor the paint film.

BACKGROUND OF THE INVENTION

A method has been desired for protecting automobiles and their parts which have been coated against the attack by various suspended matters such as dust and rainwater or other harmful matters that can damage, dull or discolor the paint film during shipping on truck or ship to overseas or other remote places.

Conventionally, a method of coating a coating material mainly comprising a wax in a thickness of 5 to 40 µm has been known as such a countermeasure. However, this method has some disadvantages. For example, it is difficult to form a wax film at a uniform thickness, making it impossible to obtain a uniform protection; a wax film is easily stained; a wax film is weak to acidic rainwater; wax or other matters penetrate in coated paint film to cause discoloration; much time and labor are required to apply and remove the wax film; and this method requires the use of a solvent and the disposal of a waste liquid, causing environmental pollution.

On the other hand, various surface protective sheets comprising a support and an adhesive layer formed thereon have been known. A sheet comprising a support having formed thereon a radiation-curing adhesive layer having a lowered glass transition point or a rubber adhesive layer made of a polyisobutylene or the like has been proposed as a surface protective sheet for an adherent having a paint film, as disclosed in, for example, JP-A-2-199184 and JP-A-6-73352. (The term "JP-A" as used herein means an "unexamined published Japanese patent application"). This sheet can overcome the above-described problems in the prior art. However, this approach has the disadvantage that when the protective sheet which has been applied to protect the surface of a paint film is peeled off, the paint film may deteriorate or discolor, causing damaged portions, and the protective sheet may not easily be removed.

As a result of extensive studies to overcome the above-described problems, it was found that the deterioration or discoloration of the paint film is due to that water or water vapor is present between the protective sheet and the paint film in adhering the protective sheet to the paint film and is sealed therebetween over a long period of time. For water or water vapor which can easily be perceived, such as large water droplet (e.g., rainwater), the presence of water or water vapor over a long period of time can easily be avoided by a wiping treatment before adhering the protective sheet or a re-adhering treatment of the protective sheet after adhering the protective sheet although such a treatment requires additional time and labor. However, even if water or water vapor which is difficult to perceive, such as mist-like water droplets, is present, the same discoloration of the paint film occurs. Thus, it is extremely difficult to completely avoid the presence of water or water vapor between the protective sheet and the paint film.

SUMMARY OF THE INVENTION

It is therefore an object of the present invention to provide a sheet for protecting a paint film, which does not cause deterioration or discoloration of the paint film even if the protective sheet is adhered to protect the surface of the paint film under the condition containing water or water vapor and the adhered state is maintained over an long period of time, and thus can maintain the adhered state without peeling off the protective sheet.

The sheet for protecting a paint film according to the present invention comprises a multi-layer substrate comprising a water or water vapor barrier layer as a surface layer and a water or water vapor-permeable layer as a back, and a pressure-sensitive adhesive layer formed on the water or water vapor-permeable layer.

According to the present invention, the sheet for protecting a paint film having the following advantageous functions can be obtained. Even if the sheet is adhered to protect the surface of the paint film under the condition containing water or water vapor, the water or water vapor diffuses into the water or water vapor-permeable layer of the multi-layer substrate and then evaporate away from the side edge of the water or water vapor-permeable layer, making it possible to prevent the deterioration or discoloration of the paint film even if continuing the adhered state of the sheet to the paint film. Accordingly, even if the sheet is adhered to protect the surface of the paint film under the condition containing water or water vapor, it is not necessary to peel off the sheet, thus eliminating the necessity of re-adhering treatment of the sheet. The sheet can prevent the penetration of rainwater or the like.

BRIEF DESCRIPTION OF THE DRAWING

The Figure is a sectional view showing one embodiment of the sheet for protecting a paint film according to the present invention, wherein the reference numeral 1 indicates a multi-layer substrate, the reference numeral 2 indicates a pressure-sensitive adhesive layer, the reference numeral 11 indicates a water or water vapor barrier layer, and the reference numeral 12 indicates a water or water vapor-permeable layer.

DETAILED DESCRIPTION OF THE INVENTION

The sheet for protecting a paint film according to the present invention comprises a multi-layer substrate comprising a water or water vapor barrier layer as a surface layer and a water or water vapor-permeable layer as a back, and a pressure-sensitive adhesive layer formed on the water or water vapor-permeable layer. One example of the sheet for protecting a paint film according to the present invention is shown in the Figure. The reference numeral 1 indicates a multi-layer substrate, the reference numeral 11 indicates a water or water vapor barrier layer, the reference numeral 12 indicates a water or water vapor permeable layer, and the reference numeral 2 indicates a pressure-sensitive adhesive layer.

The water barrier layer in the multi-layer substrate can be formed by an appropriate water-resistant material such as plastic film and metal foil.

The water or water vapor-permeable layer in the multi-layer substrate can be formed by an appropriate porous material such as porous film, nonwoven fabric, paper, woven fabric or foam having a microvoid structure. In particular, the water or water vapor-permeable layer is preferably formed by a porous film or nonwoven fabric from the standpoint of evaporation property for water or water vapor.

From the standpoints of the evaporation property for water or water vapor contained, the prevention of penetration of rainwater, etc., a particularly preferred water or water vapor-permeable layer is made of a porous material having either an average pore diameter of 10 $\mu$m or less, preferably 5 $\mu$m or less, and more preferably 0.001 to 2 $\mu$m, or an apparent density of 0.85 g/cm$^3$ or less. The water or water vapor-permeable layer according to the present invention exhibits a moisture permeability of 50 g/m$^2$·24 hr or more, preferably 500 to 50,000 g/m$^2$·24 hr, and more preferably 1,000 to 10,000 g/m$^2$·24 hr, according to JIS K 0208.

The water or water vapor barrier layer of the present invention preferably exhibits a moisture permeability of 50 g/m$^2$·24 hr or less, preferably 20 g/m$^2$·24 hr or less, and more preferably 10 g/m$^2$·24 hr or less, from the standpoint of the prevention of penetration of rainwater, etc.

The plastic for forming the water or water vapor barrier film and porous film may be any suitable plastic, and a plastic having an excellent water resistance is preferably. Examples of such a plastic include polyolefins such as polyethylene or polypropylene, polyesters, polyurethane, ethylene-vinyl acetate copolymers, polytetrafluoroethylene, polyvinyl chlorides, polyvinylidene chlorides, polyamides, acetal resins, polystyrenes, and polycarbonates.

The porous film can be formed by an appropriate method, such as a method of casting a polymer dispersion such as an emulsion, a method of stretching a film, a method of subjecting a film having removable grains incorporated therein to elution or the like to remove the grains therefrom, a method of subjecting a film to drilling such as embossing, a sintering method of fusing a resin powder under heating or a method of developing a solvent solution of a polymer, and then spraying a coagulating chemical such as solvent compatible with the solvent but not capable of dissolving the polymer to solidify the developed layer.

The multi-layer substrate can be formed by an appropriate method of, for example, laminating a material for forming the water or water vapor barrier layer and a material for forming the water or water vapor-permeable layer with a pressure-sensitive adhesive or by a heat fusion. The Figure shows the embodiment that a multi-layer substrate 1 comprises a water or water vapor barrier layer 11 as a surface layer and a water or water vapor-permeable layer 12 as a back surface layer. However, the multi-layer substrate may comprise three or more layers, for example, including an interlayer interposed between the water or water vapor barrier layer and the water or water vapor-permeable layer. The multi-layer substrate has a thickness of generally 5 to 500 $\mu$m, preferably 10 to 300 $\mu$m, and more preferably 20 to 200 $\mu$m, from the standpoint of flexibility or the like, but the present invention is not particularly limited thereto.

If required and necessary, the multi-layer substrate of the present invention may be subjected to surface treatment for the enhancement of the adhesiveness of the pressure-sensitive adhesive layer, such as corona discharge treatment, flame treatment, plasma treatment, sputter etching treatment or undercoating (e.g., primer), on the surface thereof on which the adhesive layer is formed. The multi-layer substrate of the present invention may further comprise a coating layer comprising an appropriate release agent, such as silicon-based, long-chain alkyl-based or fluorine-based release agent, provided on the surface of the multi-layer substrate on which the pressure-sensitive adhesive layer is not formed, for the purpose of forming a wound body which can be easily unwound. The multi-layer substrate, particularly the water or water vapor barrier layer, may further comprise an appropriate additive such as slip agent, antistatic agent, antioxidant or ultraviolet absorber, incorporated therein.

The pressure-sensitive adhesive layer can be formed using any appropriate pressure-sensitive adhesive such as rubber pressure-sensitive adhesive or acrylic pressure-sensitive adhesive. The rubber pressure-sensitive adhesive is preferably a rubber pressure-sensitive adhesive using a rubber polymer which does not have an aliphatic acid-based unsaturated bond or has a small content thereof, from the standpoint of prolonged stability of properties. Examples of the rubber polymer include polyisobutylenes, butyl rubbers, A-B-A type block polymers such as styrene-ethylene-butylene copolymer-styrene or styrene-butadiene-styrene, and hydrogenated products thereof. Of those rubber polymers, hydrogenated A-B-A type block polymers are preferably used.

The rubber pressure-sensitive adhesive can be prepared from one or more rubber polymers. If required and necessary, the adhesive properties of the rubber pressure-sensitive adhesive can be controlled by, for example, blending any appropriate tackifier such as terpene resins (e.g., $\alpha$-pinene polymer, $\beta$-pinene polymer, diterpene polymer, $\alpha$-pinene.ephenol copolymer), hydrocarbon resins (e.g., aliphatic resin, aromatic resin, aliphatic-aromatic copolymer), rosins, cumarone-indene resins, (alkyl)phenol resins, xylene resins or alkyd resins.

The adhesive properties of the rubber pressure-sensitive adhesive can further be controlled by blending any appropriate softening agent such as a low molecular weight polyisobutylene as a blending component corresponding to a polyisobutylene and a paraffin-based oil as a blending component corresponding to an A-B-A type block polymer, if required and necessary. In addition, the rubber pressure-sensitive adhesive may further comprise a compound having high polarity, hydrophilicity and water-absorption, such as a water-absorbing resin or an emulsifying agent, incorporated therein for the purpose of enhancing the moisture permeability of the pressure-sensitive adhesive, particularly the rubber pressure-sensitive adhesive layer. The pressure-sensitive adhesive layer may further comprise any appropriate additive such as filler, pigment, anti-aging agent or stabilizer, incorporated therein if required and necessary.

The pressure-sensitive adhesive layer can be formed as a porous layer to thereby further enhance its moisture permeability. The porous adhesive layer can be formed by any appropriate method such as a method of forming an adhesive into fibers by melt-blow method or curtain spray method, and then accumulating them into a nonwoven fabric or a method of partly applying an adhesive in a pattern such as dot and stripe.

The sheet for protecting a paint film can be formed according to the conventional methods for forming an adhesive sheet, such as method of applying a solvent solution or heat-fused solution of an adhesive to the back surface, i.e., water or water vapor-permeable layer of the multi-layer substrate or a method of transferring a pressure-sensitive adhesive layer formed on a separator onto the water or water vapor-permeable layer of the multi-layer substrate. The thickness of the pressure-sensitive adhesive layer thus formed may appropriately be determined. The thickness is generally 200 $\mu$m or less, and preferably 5 to 50 $\mu$m. If required and necessary, the pressure-sensitive adhesive layer thus formed may be protected by temporarily adhering a separator thereto until it is put into use.

The sheet for protecting a paint film of the present invention is preferably used for the surface protection of a body or parts of automobiles coated with a paint such as melamine-alkyd paint, melamine-acryl paint, acryl-urethane paint or epoxy functional acrylic resin-polyacid paint, or adherents having a paint film, such as coated metal plate (e.g., steel plate) or molded product thereof, against the collision of fine particles or attack by chemicals. In particular, the sheet for protecting a paint film of the present invention is advantageously used in the embodiments that water or water vapor tends to easily enter into the system in adhering the protective sheet or rainwater tends to easily penetrate into the interface of the sheet and the paint film during the outdoor storage.

The present invention will be described in more detail by reference to the following examples, but it should be understood that the present invention is not construed as being limited thereto. Unless otherwise indicated, all parts, percents, ratios and the like are by weight.

EXAMPLE 1

A toluene solution of a rubber pressure-sensitive adhesive made of a mixture of 90 parts of a polyisobutylene having a viscosity average molecular weight of 1,000,000 and 10 parts of a polyisobutylene having a viscosity average molecular weight of 80,000 was applied to a multi-layer substrate composed of a laminate of a water or water vapor barrier polypropylene film having a thickness of 30 $\mu$m (apparent density: 0.89 g/cm$^3$) and a porous polyethylene film composed of polyethylene and having a thickness of 90 $\mu$m and an apparent density of 0.85 g/cm$^3$ (Porum #70, produced by Tokuyama Co., Ltd.) on the porous film surface thereof. The coated solution was then dried at 50° C. for 5 minutes to obtain a sheet for protecting a paint film, having a 15 $\mu$m thick pressure-sensitive adhesive layer.

EXAMPLE 2

A sheet for protecting a paint film was prepared in the same manner as in Example 1 except that an anionic emulsifying agent (sodium dodecylbenzenesulfonate) was blended with the rubber pressure-sensitive adhesive in an amount of 5 parts.

EXAMPLE 3

A sheet for protecting a paint film was prepared in the same manner as in Example 1 except that a water-absorbing resin having a deionized water absorbing power of 200 g/g and a maximum particle size of 100 $\mu$m (AQALIC CA ML-100, produced by NIPPON SHOKUBAI CO., LTD.) was blended with the rubber pressure-sensitive adhesive in an amount of 10 parts.

EXAMPLE 4

A sheet for protecting a paint film was prepared in the same manner as in Example 1 except that a multi-layer substrate obtained by applying a pressure-sensitive adhesive layer to a laminate of a water barrier polypropylene film having a thickness of 30 $\mu$m and a nonwoven fabric having an apparent density of 0.21 g/cm$^3$ (ELTAS N01020, produced by ASAHI CHEMICAL INDUSTRY CO., LTD.) on the nonwoven fabric surface thereof was used as the multi-layer substrate.

EXAMPLE 5

A sheet for protecting a paint film was prepared in the same manner as in Example 4 except that a mixture of 100 parts of an A-B-A type block polymer made of styrene-ethylene/butylene copolymer-styrene (KRATON G-1657, produced by Shell Kagaku K.K.) and 40 parts of a hydrogenated petroleum resin (ARKON P-100, produced by Arakawa Chemical Industries, Ltd.) was used as the rubber pressure-sensitive adhesive.

EXAMPLE 6

A sheet for protecting a paint film was prepared in the same manner as in Example 4 except that a method was employed which comprises kneading the rubber pressure-sensitive adhesive obtained in Example 5 by a kneader, forming the adhesive into chips, subjecting the chips to melt blow process using a dice to form fibers having an average diameter of about 20 $\mu$m, accumulating the fibers on a separator in a weight of 20 g/m$^2$ to form a porous layer, and then transferring the porous layer onto the multi-layer substrate. The melt blow above was effected at a dice temperature of 200° C., a hot air temperature of 210° C., a hot air pressure of 1.0 to 2.0 kg/cm$^2$ and a conveyor linear speed of 3 m/min.

Comparative Example 1

A sheet for protecting a paint film was obtained in the same manner as in Example 1 except that a water or water vapor barrier polyester film having a thickness of 50 $\mu$m (apparent density: 1.4 g/cm$^3$) was used as the substrate for the adhesive layer.

Comparative Example 2

A sheet for protecting a paint film was obtained in the same manner as in Example 1 except that as a multi-layer substrate obtained by applying a pressure-sensitive adhesive layer to a laminate of a water or water vapor barrier polypropylene film having a thickness of 30 $\mu$m and a water or water vapor barrier polyester film having a thickness of 50 $\mu$m on the polyester film side thereof was used as the multi-layer substrate.

Comparative Example 3

A sheet for protecting a paint film was obtained in the same manner as in Example 1 except that a nonwoven fabric (ELTAS N01020) was used as the substrate for the pressure-sensitive adhesive.

Evaluation Test

The sheets for protecting a paint film obtained in the above examples and comparative examples were subjected to the following tests.

Water or Water Vapor Evaporatability

Water was sprayed onto a melamine-acryl paint (MAGICRON, tradename, manufactured by Kansai Paint Co., Ltd.) film formed on an iron plate. The sheet for protecting a paint film was then adhered to the wet surface of the paint film. The iron plate with the sheet was then allowed to stand at 40° C. for 48 hours. The sheet was then peeled off the paint film on the iron plate to see if water or water vapor remained on the melamine-acryl paint film.

Water or Water Vapor Barrier Properties

The sheet for protecting a paint film was adhered to the melamine-acryl paint film formed on an iron plate while forming a nearly hemi-spherical foam portion having a diameter of about 1 cm therein. Shower water was then sprayed onto the iron plate for 10 minutes. The sheet was then peeled off the paint to see if water or water vapor entered into the foam portion.

The results of the tests are shown in the Table below.

TABLE

|  | Example | | | | | | Comparative Example | | |
|---|---|---|---|---|---|---|---|---|---|
| Water or water vapor evaporatability (Water or water vapor remianing) | None | None | None | None | None | None | Some | Some | Some |
| Water or water vapor barrier properties (Penetration of water of water vapor) | None | None | None | None | None | None | None | None | Some |

While the invention has been described in detail and with reference to specific embodiments thereof, it will be apparent to one skilled in the art that various changes and modifications can be made therein without departing from the spirit and scope thereof.

What is claimed is:

1. A sheet for protecting a paint film, said sheet comprising a multi-layer substrate comprising a water or water vapor barrier layer as a surface layer and a water or water vapor-permeable layer as a back, and a pressure-sensitive adhesive layer formed on said water or water vapor-permeable layer.

2. The sheet as claimed in claim 1, wherein said pressure-sensitive adhesive layer comprises a rubber pressure-sensitive adhesive comprising at least one member selected from the group consisting of polyisobutylene, butyl rubber and A-B-A type block polymer.

3. The sheet as claimed in claim 1, wherein said water or water vapor barrier layer has a moisture permeability of 50 $g/m^2 \cdot 24$ hr or less.

4. The sheet as claimed in claim 1, wherein said water or water vapor-permeable layer comprises a porous material having a average pore diameter of 10 $\mu$m or less or an apparent density of 0.85 $g/cm^3$ or less.

5. The sheet as claimed in claim 1, wherein said sheet has a structure permitting evaporation of water or water vapor from the sides of the water or water vapor-permeable layer.

6. The sheet as claimed in claim 1, wherein said water or water vapor barrier layer comprises a plastic film.

7. The sheet as claimed in claim 1, wherein said water or water vapor-permeable layer comprises a porous film or a non-woven fabric.

8. The sheet as claimed in claim 1, wherein said multi-layer substrate has a thickness of 50 to 500 $\mu$m.

* * * * *